United States Patent
Yi et al.

(10) Patent No.: US 9,008,067 B2
(45) Date of Patent: Apr. 14, 2015

(54) METHOD FOR ALLOWING TERMINAL TO TRANSMIT POWER HEADROOM INFORMATION IN WIRELESS COMMUNICATION SYSTEM AND DEVICE THEREFOR

(75) Inventors: Seungjune Yi, Anyang-si (KR); Sungduck Chun, Anyang-si (KR); Sunghoon Jung, Anyang-si (KR); Youngdae Lee, Anyang-si (KR); Sungjun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 163 days.

(21) Appl. No.: 13/701,340

(22) PCT Filed: Jun. 17, 2011

(86) PCT No.: PCT/KR2011/004440
§ 371 (c)(1),
(2), (4) Date: Nov. 30, 2012

(87) PCT Pub. No.: WO2011/159126
PCT Pub. Date: Dec. 22, 2011

(65) Prior Publication Data
US 2013/0070685 A1    Mar. 21, 2013

Related U.S. Application Data

(60) Provisional application No. 61/356,552, filed on Jun. 18, 2010, provisional application No. 61/373,256, filed on Aug. 12, 2010.

(30) Foreign Application Priority Data

Jun. 15, 2011    (KR) .......................... 10-2011-0058045

(51) Int. Cl.
*H04W 4/00* (2009.01)
*H04W 52/54* (2009.01)
(Continued)

(52) U.S. Cl.
CPC .............. *H04W 52/54* (2013.01); *H04W 52/04* (2013.01); *H04W 24/10* (2013.01)

(58) Field of Classification Search
CPC ............ H04W 52/367; H04W 52/365; H04W 52/146; H04W 52/343; H04W 72/04; H04W 72/1284; H04W 52/16; H04W 52/267; H04W 28/22; H04W 36/18; H04W 52/26; H04W 52/346; H04W 52/42; H04W 24/00; H04W 48/08
USPC .................................................. 370/431–546
See application file for complete search history.

(56) References Cited

U.S. PATENT DOCUMENTS 8,351,359 B2 * 1/2013 Heo et al. ..................... 370/310
8,457,091 B2 * 6/2013 Pani et al. ..................... 370/342
(Continued)

FOREIGN PATENT DOCUMENTS

CN    101340711 A    1/2009
CN    101715207 A    5/2010
(Continued)

OTHER PUBLICATIONS

LG Electronics Inc., "PHR format for CA," 3GPP TSG-RAN2 Meeting #70bis, R2-103937, Stockholm, Sweden, Jun. 28-Jul. 2, 2010, 2 pages.
(Continued)

*Primary Examiner* — Fan Ng
(74) *Attorney, Agent, or Firm* — Birch, Stewart, Kolasch & Birch, LLP

(57) ABSTRACT

The present invention relates to a wireless communication system, and more specifically, to a method for allowing a terminal to transmit power headroom information in a wireless communication system and a device therefor. According to one aspect of the present invention, a method for allowing a terminal, in which at least one serving cell is set, to transmit power headroom information comprises the steps of: generating said power headroom information; and transmitting the power headroom information to a base station. In this case, said power headroom information includes a first field that includes a plurality of indicators, and at least one second field that indicates a power headroom level, wherein each of the plurality of indicators is capable of indicating whether at least one said second field for at least one of each of the serving cell exists.

27 Claims, 11 Drawing Sheets

(51) Int. Cl.
*H04W 52/04* (2009.01)
*H04W 24/10* (2009.01)

(56) References Cited

U.S. PATENT DOCUMENTS

| | | | |
|---|---|---|---|
| 8,744,341 B2* | 6/2014 | Heo et al. | 455/7 |
| 2001/0036831 A1 | 11/2001 | Rezaiifar et al. | |
| 2007/0115871 A1* | 5/2007 | Zhang et al. | 370/318 |
| 2010/0008307 A1* | 1/2010 | Torsner et al. | 370/329 |
| 2010/0296470 A1* | 11/2010 | Heo et al. | 370/329 |
| 2011/0021197 A1* | 1/2011 | Ngai | 455/436 |
| 2011/0096677 A1 | 4/2011 | Kim | |
| 2012/0294694 A1* | 11/2012 | Garot | 411/427 |
| 2013/0153298 A1* | 6/2013 | Pietraski et al. | 175/45 |

FOREIGN PATENT DOCUMENTS

| | | |
|---|---|---|
| CN | 101729108 A | 6/2010 |
| JP | 2013-509759 A | 3/2013 |
| JP | 2013-528005 A | 7/2013 |
| KR | 2001-0024009 A | 3/2001 |
| KR | 10-2008-0021770 A | 3/2008 |
| KR | 10-2009-0016415 A | 2/2009 |
| WO | WO 2010/065759 A2 | 6/2010 |
| WO | WO 2011/050921 A1 | 5/2011 |
| WO | WO 2011/120448 A1 | 10/2011 |

OTHER PUBLICATIONS

Motorola, "Power Headroom Reporting for CA," 3GPP TSG RAN WG2 Meeting #70 Tdoc R2-102762, May 4, 2010, 5 pages.
Nokia Siemens Networks et al., "PHR for carrier aggregation," 3GPP TSG-RAN WG2 Meeting #69bis R2-102165, Beijing, China, Apr. 12-16, 2010, 2 pages.
Potevio, "Remaining Issues on PHR for CA," 3GPP TSG RAN WG2 #70, R2-102770, Montreal, Canada, May 10-14, 2010, 3 pages.
RAN1, "LS on power headroom reporting for carrier aggregation," 3GPP TSG RAN WG1 Meeting #61, R1-103405, Montreal, Canada, May 10-14, 2010, 1 page.

* cited by examiner (a) CONTROL-PLANE PROTOCOL STACK b) USER-PLANE PROTOCOL STACK

FIG. 7

| R | R | PH |
|---|---|----|

FIG. 8A

| R | R | E | LCID | Oct 1 |
|---|---|---|------|-------|

R/R/E/L CID sub-header

FIG. 9

[MAC subheader for PHR-CA]

| R | R | E | LCID = PHR-CA |
|---|---|---|---|

[MAC CE for PHR-CA]    BITMAP

| R | R | R | 0 | 1 | 0 | 0 | 1 |
|---|---|---|---|---|---|---|---|
| R | R | PHR for Carrier 1 ||||||
| R | R | PHR for Carrier 4 ||||||

FIG. 10

[MAC subheader for PHR-CA]

| R | R | E | LCID = PHR-CA |
|---|---|---|---|

[MAC CE for PHR-CA]

| 0 | 0 | 1 | 0 | 1 | 0 | 0 | 1 | BITMAP |
|---|---|---|---|---|---|---|---|---|
| R | R | PHR Type1 for Carrier 1 ||||||| 
| R | R | PHR Type2 for Carrier 1 |||||||
| R | R | PHR for Carrier 4 |||||||
| R | R | PHR for Carrier 6 |||||||

PHR for Carrier 1 (covers the first two rows)

2

METHOD FOR ALLOWING TERMINAL TO TRANSMIT POWER HEADROOM INFORMATION IN WIRELESS COMMUNICATION SYSTEM AND DEVICE THEREFOR

CROSS REFERENCE TO RELATED APPLICATIONS

This application is the National Phase of PCT/KR2011/004440 filed on Jun. 17, 2011, which claims priority under 35 U.S.C. 119(e) to U.S. Provisional Application Nos. 61/356,552 filed on Jun. 18, 2010 and 61/373,256 filed on Aug. 12, 2010 and under 35 U.S.C. 119(a) to Patent Application No. 10-2011-0058045 filed in Republic of Korea on Jun. 15, 2011, all of which are hereby expressly incorporated by reference into the present application.

TECHNICAL FIELD

The present invention relates to a wireless communication system, and more particularly to, a method for allowing a terminal to transmit power headroom information in a wireless communication system, and an apparatus for the same.

BACKGROUND ART

As an example of a mobile communication system to which the present invention is applicable, a 3rd Generation Partnership Project Long Term Evolution (hereinafter, "LTE") communication system is described in brief.

FIG. 1 is a diagram schematically showing a network structure of an E-UMTS as an exemplary radio communication system. An Evolved Universal Mobile Telecommunications System (E-UMTS) is a system evolving from a conventional Universal Mobile Telecommunications System (UMTS) and basic standardization task thereof is currently underway in the 3GPP. The E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE) 120, e Node Bs (eNBs) 110a and 110b, and an Access Gateway (AG) which is located at an end of the network (E-UTRAN) and connected to an external network. The eNode Bs may simultaneously transmit multiple data streams for a broadcast service, a multicast service, and/or a unicast service.

One or more cells may exist in one eNode B. A cell is set to use one of bandwidths of 1.25, 2.5, 5, 10, and 20 MHz to provide a downlink or uplink transport service to several UEs. Different cells may be set to provide different bandwidths. The eNode B controls data transmission and reception for a plurality of UEs. The eNode B transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNode B transmits uplink scheduling information with respect to uplink data to a corresponding UE to inform the UE of an available time/frequency domain, coding, data size, and HARQ-related information. An interface for transmitting user traffic or control traffic may be used between eNode Bs. A Core Network (CN) may include the AG, a network node for user registration of the UE, and the like. The AG manages mobility of a UE on a Tracking Area (TA) basis, wherein one TA includes a plurality of cells.

Although radio communication technology has been developed up to LTE based on Wideband Code Division Multiple Access (WCDMA), the demands and expectations of users and providers continue to increase. In addition, since other radio access technologies continue to be developed, new technical evolution is required to secure competitiveness in the future. For example, decrease of cost per bit, increase of service availability, flexible use of a frequency band, simple structure, open interface, and suitable power consumption by a UE are required.

Recently, 3GPP has been establishing a standard task for a subsequent technique of LTE. In this specification, such a technique is referred to as "LTE-Advanced" or "LTE-A". One of the main differences between an LTE system and an LTE-A system is a system bandwidth. The LTE-A system is aimed at supporting a broadband of a maximum of 100 MHz, and to this end, the LTE-A system is designed to use a carrier aggregation or bandwidth aggregation technique using a plurality of frequency blocks. Carrier aggregation employs a plurality of frequency blocks as one big logical frequency band in order to use a wider frequency band. A bandwidth of each frequency block may be defined based on a bandwidth of a system block used in the LTE system. Each frequency block is transmitted using a component carrier.

DISCLOSURE

Technical Problem

An object of the present invention devised to solve the problem lies in providing a method for allowing a terminal to transmit power headroom information in a wireless communication system, and an apparatus for the same.

Technical Solution

An object of the present invention can be achieved by providing a method for transmitting, by a user equipment (UE) in which at least one serving cell is set, power headroom (PH) information in a wireless communication system, including generating the power headroom information, and transmitting the power headroom information to a base station.

Alternatively or additionally, the power headroom information includes a first field including a plurality of indicators and at least one second field indicating a level of the power headroom, and each of the plurality of indicators indicates whether the at least one second field exists for each of the at least one serving cell.

Alternatively or additionally, each of the plurality of indicators is set to 0 or 1, an indicator, which has been set to 1, indicates that a second field exists for a corresponding serving cell, and an indicator, which has been set to 0, indicates that a second field does not exist for a corresponding serving cell.

Alternatively or additionally, the at least one second field may be for an activated serving cell among the at least one serving cell.

Alternatively or additionally, in the case in which generation of a second field corresponding to any one of the at least one serving cell is triggered, the at least one second field may be for the whole of the at least one serving cell.

Alternatively or additionally, the power headroom information may be transmitted through one of the at least one serving cell.

Alternatively or additionally, the first field is a field in a bitmap form, and may be included the power headroom information regardless of whether the at least one second field exists.

Alternatively or additionally, the power headroom information may be included in a medium access control (MAC) control element (CE).

Alternatively or additionally, the MAC CE may further include a logical channel ID (LCID) for notifying existence of the power headroom information.

Alternatively or additionally, the at least one second field may be configured in a cell index order of each of the at least one serving cell.

In another aspect of the present invention, provided herein is a user equipment (LIE), in which at least one serving cell is set, for transmitting power headroom (PH) information in a wireless communication system, including a processor for generating the power headroom information, and a transmission module for transmitting the power headroom information to a base station.

Alternatively or additionally, the power headroom information includes a first field including a plurality of indicators and at least one second field indicating a level of the power headroom, and each of the plurality of indicators indicates whether the at least one second field exists for each of the at least one serving cell.

Alternatively or additionally, each of the plurality of indicators is set to 0 or 1, an indicator, which has been set to 1, indicates that a second field exists for a corresponding serving cell, and an indicator, which has been set to 0, indicates that a second field does not exist for a corresponding serving cell.

Alternatively or additionally, the at least one second field may be for an activated serving cell among the at least one serving cell.

Alternatively or additionally, in the case in which generation of a second field corresponding to any one of the at least one serving cell is triggered, the at least one second field may be for the whole of the at least one serving cell.

Alternatively or additionally, the power headroom information may be transmitted through one of the at least one serving cell.

Alternatively or additionally, the first field is a field in a bitmap form, and may be included the power headroom information regardless of whether the at least one second field exists.

Advantageous Effects

According to embodiments of the present invention, a terminal can effectively transmit power headroom information to a base station.

The effects of the present invention are not limited to the effects mentioned above, and other effects will be clearly understood by those skilled in the art from the disclosure below.

DESCRIPTION OF DRAWINGS

FIG. 7 is a diagram showing the structure of power headroom information defined in an LTE system.

FIG. 9 is a diagram showing an MAC subheader and an MAC CE format for PHR-CA according to an exemplary embodiment of the present invention.

FIG. 10 is a diagram showing an MAC subheader and another MAC CE format for PHR-CA according to an exemplary embodiment of the present invention.

BEST MODEL

Hereinafter, structures, operations, and other features of the present invention will be understood readily from the embodiments of the present invention, examples of which are illustrated in the accompanying drawings. Embodiments described later are examples in which technical features of the present invention are applied to a 3GPP system.

For convenience, although the embodiments of the present invention will be described based on the LTE system and the LTE-A system, the LTE system and the LTE-A system are only exemplary and the embodiments of the present invention can be applied to all communication systems corresponding to the aforementioned definition. Also, although the embodiments of the present invention will herein be described based on FDD mode, the FDD mode is only exemplary and the embodiments of the present invention can easily be applied to H-FDD mode or TDD mode.

Figure 1:
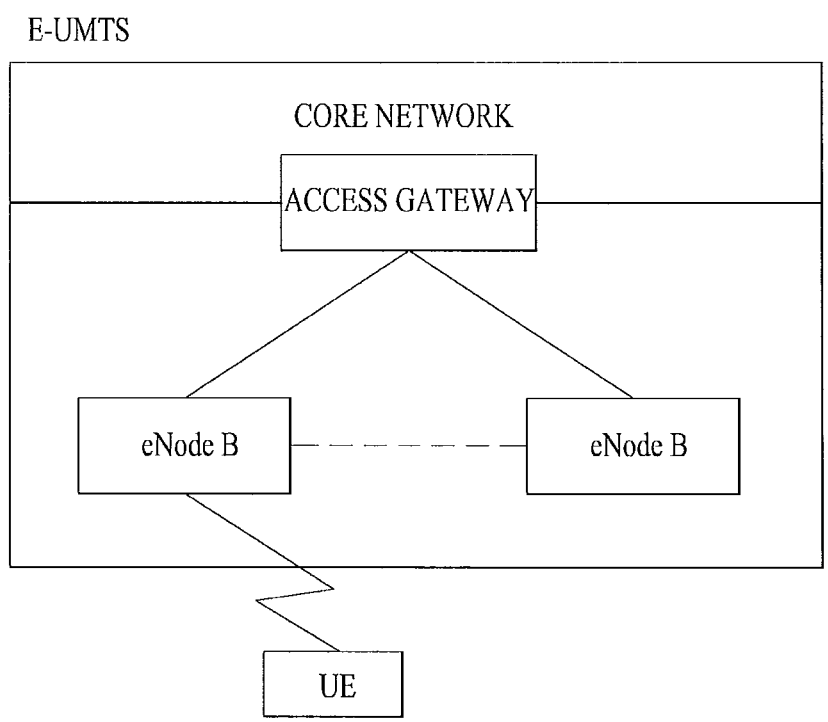
FIG. 1 is a diagram schematically showing a network structure of an E-UMTS as an exemplary radio communication system.
Figure 2:
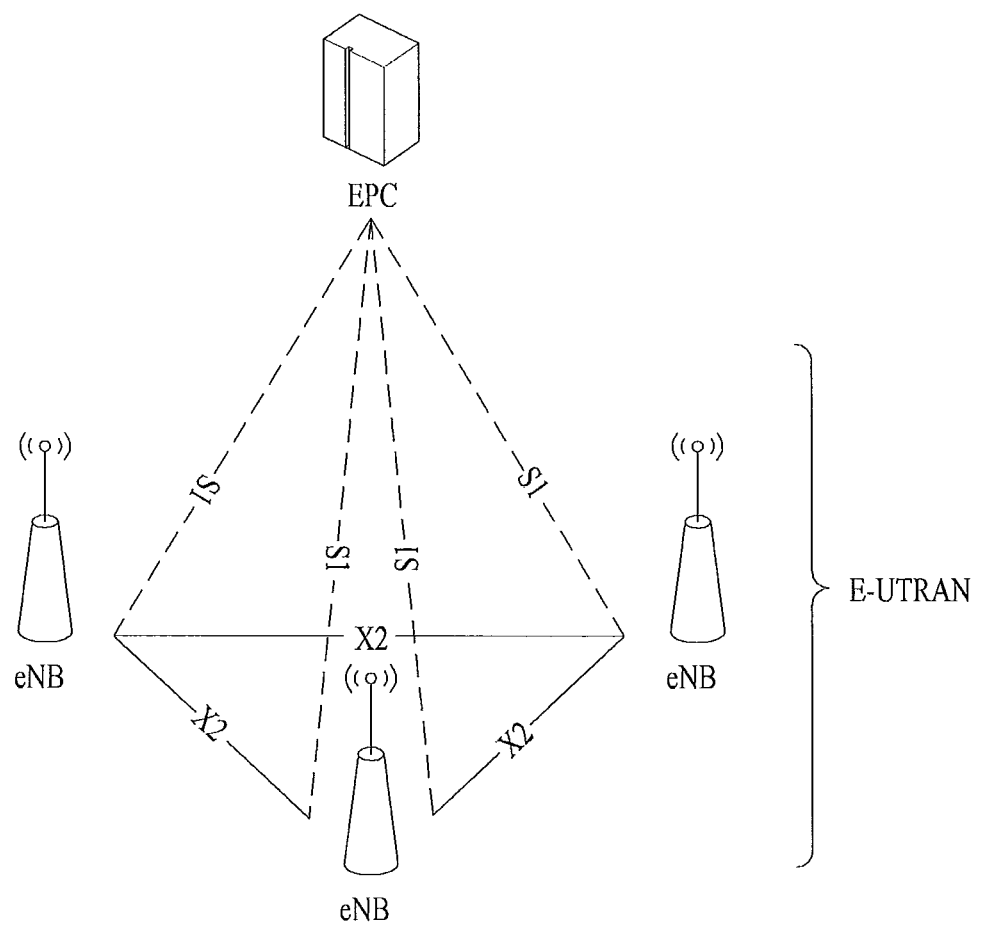
FIG. 2 is a diagram conceptually showing a network structure of an Evolved Universal Terrestrial Radio Access Network (E-UTRAN).

FIG. 2 is a diagram conceptually showing a network structure of an Evolved Universal Terrestrial Radio Access Network (E-UTRAN). In particular, the E-UTRAN system is a system which has been evolved from the existing UTRAN system. The E-UTRAN comprises cells (eNBs or base stations), and the cells are connected through X2 interface. The cells are connected with the user equipment (UE) through the wireless interface, and are connected with the evolved packet core (EPC) through S1 interface.

The EPC comprises a mobility management entity (MME), a serving-gateway (S-GW) and a packet data network-gateway (PDN-GW). The MME has connection information of an UE or information on capability of the UE, and such information is mainly used for mobility management. The S-GW is a gateway having the E-UTRAN as the endpoint.

Figure 3:
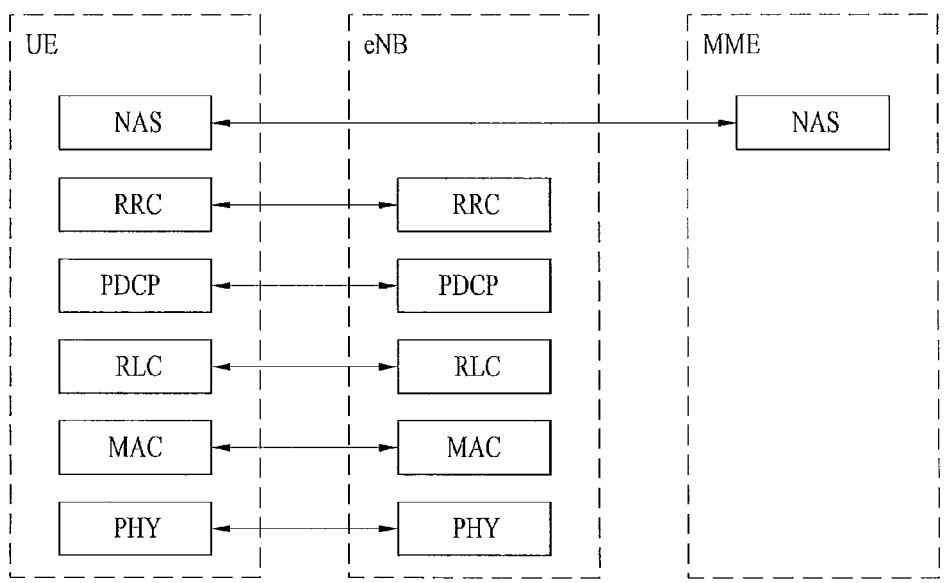
FIG. 3 is a diagram showing structures of a control plane and a user plane of a radio interface protocol between a UE and an E-UTRAN based on the 3GPP radio access network specification.
Figure 3:
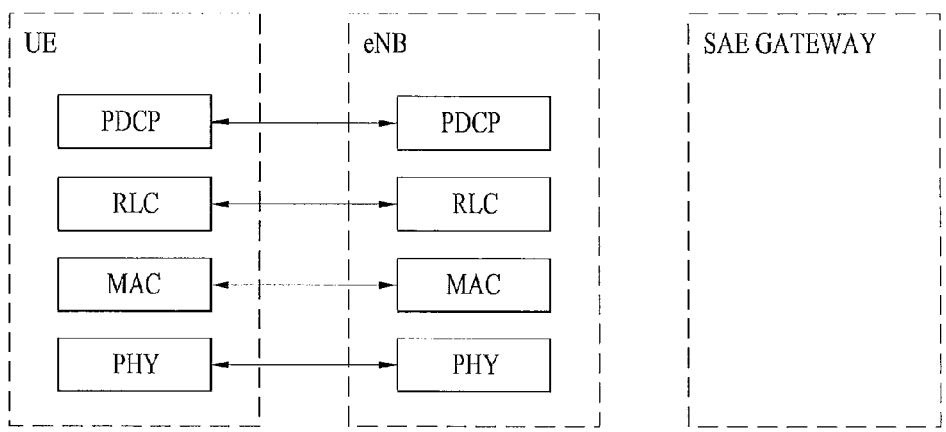

FIG. 3 is a diagram showing structures of a control plane and a user plane of a radio interface protocol between a UE and an E-UTRAN based on the 3GPP radio access network specification. The control plane refers to a path used for transmitting control messages, which are used by a User Equipment (UE) and a network to manage a call. The user plane refers to a path used for transmitting data generated in an application layer, e.g., voice data or Internet packet data.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearer refers to a service provided by the second layer to transmit data between the UE and the network. To this end, the RRC layer of the UE and the RRC layer of the network exchange RRC messages.

One cell of the eNB (base station) is set to use one of bandwidths such as 1.25, 2.5, 5, 10, 15, and 20 MHz to provide a downlink or uplink transmission service to UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH).

Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
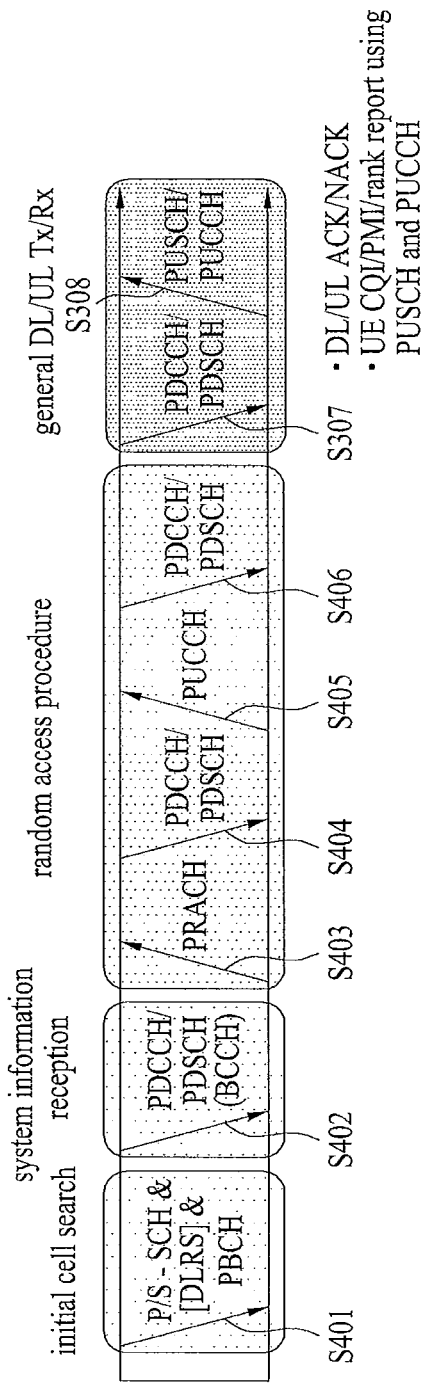
FIG. 4 is a diagram showing physical channels used in a 3GPP system and a general signal transmission method using the same.

FIG. 4 is a diagram showing physical channels used in a 3GPP system and a general signal transmission method using the same.

A UE performs an initial cell search operation such as establishment of synchronization with an eNB when power is turned on or the UE enters a new cell (S401). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (S402).

Meanwhile, if the UE initially accesses the eNB or if radio resources for signal transmission are not present, the UE may perform a random access procedure (S403 to S406) with respect to the eNB. To this end, the UE may transmit a specific sequence through a Physical Random Access Channel (PRACH) as a preamble (S403), and receive a response message to the preamble through the PDCCH and the PDSCH corresponding thereto (S404). In the case of a contention-based RACH, a contention resolution procedure may be additionally performed.

The UE which performs the above procedures may receive a PDCCH/PDSCH (S407) and transmit a Physical Uplink Shared Channel (PUSCH)/Physical Uplink Control Channel (PUCCH) (S408) according to a general uplink/downlink signal transmission procedure. In particular, the UE receives the downlink control information (DCI) through the PDCCH. Here, the DCI includes control information such as resource allocation information on the UE, and the format is different depending on the purpose of use.

Control information transmitted by the UE to the eNB through uplink or received by the UE from the eNB through downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 5:
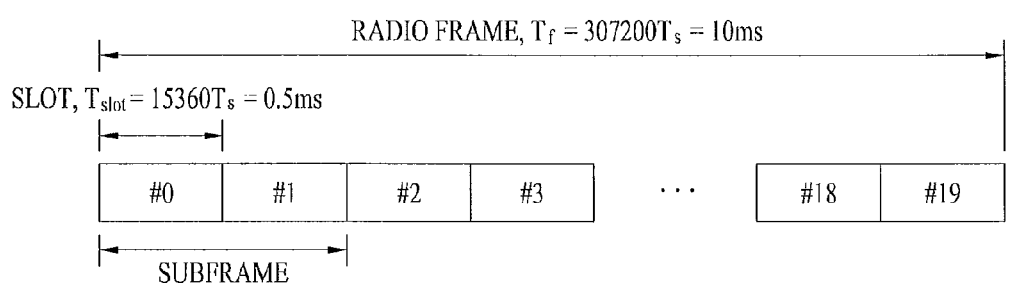
FIG. 5 is a diagram showing the structure of a radio frame used in an LTE system.

FIG. 5 is a diagram showing the structure of a radio frame used in an LTE system.

Referring to FIG. 5, the radio frame has a length of 10 ms (327200 $T_s$) and includes 10 equal-sized subframes. Each of the subframes has a length of 1 ms and includes two slots. Each of the slots has a length of 0.5 ms (15360 $T_s$). In this case, $T_s$ denotes sampling time and is represented by $T_{s=1}/(15 \text{ kHz} \times 2048) = 3.2552 \times 10^{-8}$ (about 33 ns). Each slot includes a plurality of OFDM symbols in a time domain and includes a plurality of resource blocks in a frequency domain. In the LTE system, one resource block includes 12 subcarriers×7 (or 6) OFDM symbols. A Transmission Time Interval (TTI) which is a unit time for data transmission may be determined in units of one or more subframes. The above-described structure of the radio frame is purely exemplary and various modifications may be made in the number of subframes included in a radio frame, the number of slots included in a subframe, or the number of OFDM symbols included in a slot.

Hereinafter, an RRC state of the UE and a method of connecting RRC will now be described in detail. The RRC state refers to whether or not the RRC of a user equipment (UE) is in a logical connection with the RRC of a E-UTRAN. In case the RRCs are logically connected to one another, the RRC state is indicated as an RRC_CONNECTED state. And, in case the RRCs are not logically connected to one another, the RRC state is indicated as RRC_IDLE state.

Since an RRC connection exists in the UE of the RRC_CONNECTED state, the E-UTRAN may recognize the existence of the corresponding user equipment (UE) in the cell unit and may effectively control the user equipment (UE). Conversely, the E-UTRAN is incapable of recognizing the UE of the RRC_IDLE state. And, herein, an EPC manages the UE in Tracking Area units, which correspond to area units larger than the cell units. That is, in order to receive generic mobile communication services, such as sound (or audio data) or data, the RRC should be shifted to the RRC_CONNECTED state.

When the user initially turns on the power of the UE, the UE searches for an adequate cell and remains in the RRC_IDLE state within the corresponding cell. Once the UE that was in the RRC Idle state is required to make an RRC connection, the RRC of the UE can then make an RRC connection with the RRC of the E-UTRAN through an RRC connection establishment procedure, thereby shifting to the RRC_CONNECTED state. Examples of when the UE, which was in the RRC_IDLE state, is required to make an RRC connection includes a case when an uplink data transmission is required due to reasons, such as the user's attempt to make a phone call, or a case when a response message transmission is required to be made after receiving a paging message from the E-UTRAN.

Figure 6:
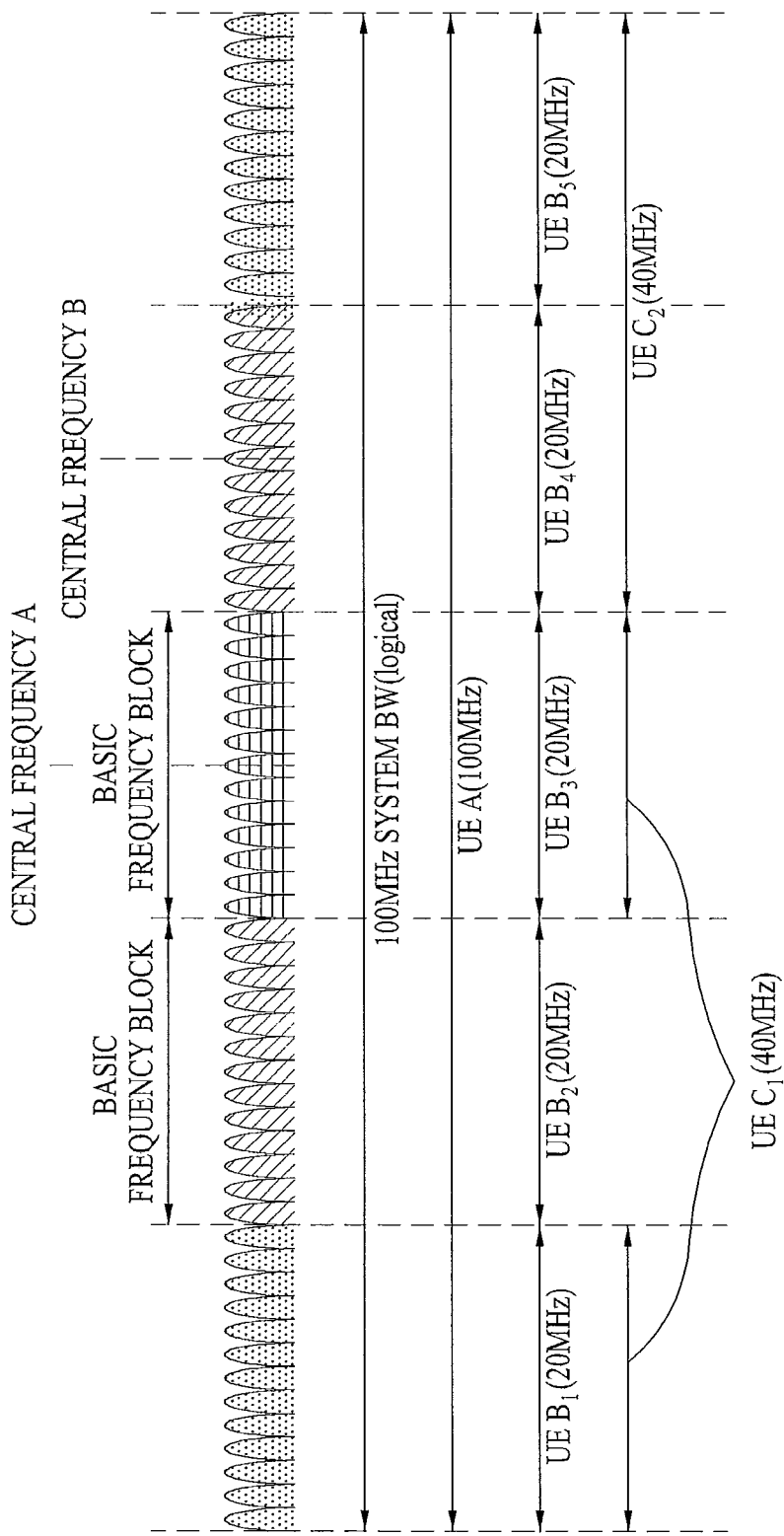
FIG. 6 is a diagram showing the concept of a carrier aggregation scheme.

FIG. 6 is a conceptual diagram illustrating a carrier aggregation scheme. Carrier aggregation refers to a method of using a plurality of frequency blocks or cells composed of uplink resources (or component carriers) and/or uplink resources (or component carriers) as a large logical frequency band in order to use a wider frequency band in a radio communication system. Hereinafter, for the convenience of explanation, the component carriers are expressed as serving cells.

Referring to FIG. 6, an entire system band is a logical band having a maximum bandwidth of 100 MHz. The entire system band includes five serving cells (SC) and each SC has a maximum bandwidth of 20 MHz. The SC includes one or more physically contiguous subcarriers. Although all SCs have the same bandwidth in FIG. 6, this is only exemplary and the SCs may have different bandwidths. Although the SCs are shown as being contiguous in the frequency domain in FIG. 6, FIG. 6 merely shows the logical concept and thus the SCs may be physically contiguous or separated.

Different center frequencies may be used for the SCs or one common center frequency may be used for physically contiguous SCs. For example, in FIG. 10, if it is assumed that all SCs are physically contiguous, a center frequency A may be used. If it is assumed that SCs are not physically contiguous, a center frequency A, a center frequency B and the like may be used for the respective SCs.

In the present specification, the SC may correspond to a system band of a legacy system. By defining the SC based on the legacy system, it is possible to facilitate backward compatibility and system design in a radio communication environment in which an evolved UE and a legacy UE coexist. For example, if the LTE-A system supports carrier aggregation, each SC may correspond to the system band of the LTE system. In this case, the SC may have any one bandwidth such as 1.25, 2.5, 5, 10 or 20 MHz.

In the case in which the entire system band is extended by carrier aggregation, a frequency band used for communication with each UE is defined in SC units. A UE A may use 100 MHz which is the bandwidth of the entire system band and perform communication using all five SCs. Each of UEs $B_1$ to $B_5$ may only use a bandwidth of 20 MHz and perform communication using one SC. Each of UEs $C_1$ and $C_2$ may use a bandwidth of 40 MHz and perform communication using two SCs. The two SCs may be logically/physically contiguous or discontiguous. The UE $C_1$ uses two discontiguous SCs and the UE $C_2$ uses two contiguous SCs.

The LTE-A system suggests a concept of calling a serving cell, in which all control signals are transmitted, a primary serving cell. An uplink primary serving cell and a downlink primary serving cell may be included in each UE, and such a combination of the uplink primary serving cell, which is used in transmission of uplink control information, and the downlink primary serving cell, which is used in transmission of downlink control information, may be called a primary cell or a PCell. The cells included in the UE other than the primary cell or PCell may be called a secondary cell or a SCell.

Further, in order for a UE to transmit data to the base station, transmission power should be appropriately regulated. In the case in which the transmission power of the UE is too low, there is a high probability that the base station does not receive data transmitted by the UE. Further, in the case in which the transmission power is too high, the base station may receive the data of the UE, but it may be difficult to receive the data transmitted by a UE other than the UE.

Therefore, in order to prevent performance deterioration of the transmission and reception of the data of the entire LTE system, the base station needs to optimize the transmission power of the UE.

In order for the base station to adjust the transmission power of the UE, the base station should obtain information for control of the transmission power from the UE. A power headroom report (PHR) of the UE is used for this, and here, the power headroom refers to power which may be additionally used in addition to the power currently transmitted by the UE. In other words, the power headroom refers to the difference between the maximum power, which may be transmitted by the UE, and the power, which is currently being transmitted by the UE.

If the base station receives a report on the power headroom from the UE, the base station determines power to be used in the next uplink transmission of the UE on the basis of the received power headroom information.

Such determined transmission power is expressed as the size of the resource block and the modulation and coding scheme (MCS), and is transmitted to the UE when allocating the uplink (UL) grant of the next transmission period.

At this time, transmitting, by the UE, the power headroom report too frequently may cause deterioration of the performance by causing a waste of wireless resources. Hence, the UE may configure the power headroom report only in the case in which preset conditions are satisfied. Hereinafter, this is called a PER trigger condition.

The PHR trigger condition may include the conditions described below. First, after transmitting the power headroom report to the base station, the case, in which the path loss exceeds a preset range, may be set as a condition. Next, the case, which a parameter related with the power headroom information is set or reset, or the case, in which a preset power headroom information timer expires, may be set as a condition. However, the above described conditions are merely exemplary, and it is possible to set various conditions as a PHR trigger condition without any limitation.

In the case in which a preset condition is satisfied, the configuration of the power headroom report of the UE is triggered, and if there is a newly received uplink (UL) grant in the TTI, the UE performs transmission of the power headroom report through the process described below.

That is, the UE receives the power headroom information level value transmitted from the physical layer, and generates and transmits the PHR MAC control element (CE) on the basis of the power headroom information level value. Thereafter, the UE may restart the preset power headroom information timer.

As described, above, when transmitting the power headroom information, the UE transmits the information in the form of a PHR MAC CE, and this will be described below in more detail.

FIG. 7 is a diagram showing the structure of power headroom information defined in an LTE system.

In FIG. 7, the power headroom information includes a reserved bit and a PH field. The portion expressed as R is the reserved bit, and the actual power headroom value is reported through the PH field. In the current LTE system, 6 bits are used in the PH field, and a total of 64 power headroom information level values may be notified.

In order for the UE to transmit the power headroom information through the PHR MAC CE, the logical channel ID (LCID) value for the PHR MAC CE is allocated in the uplink shared channel (UL-SCH) (e.g., the ID value of 11010 is allocated as the LCID). This will be described in more tailed with reference to FIG. 8.

Figure 8B:
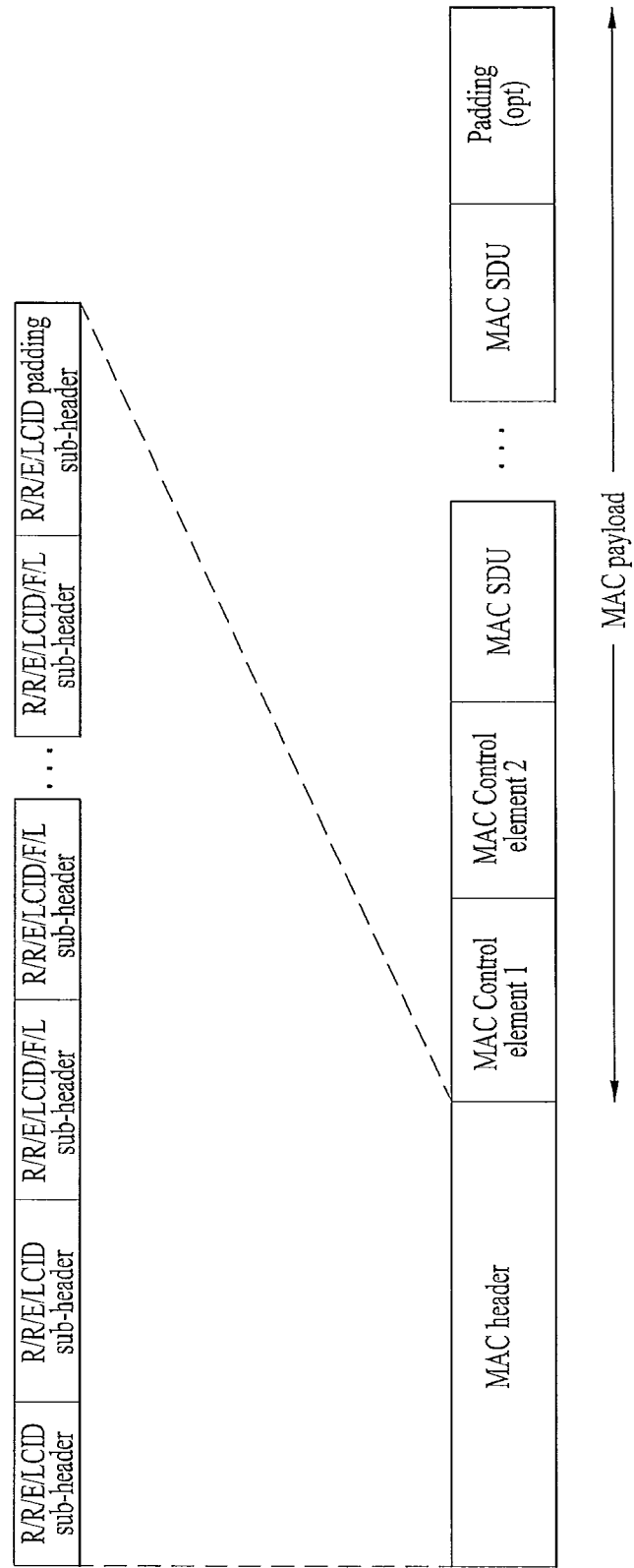
FIG. 8 is a diagram showing the structure of an MAC subheader defined in an LTE system.

FIG. 8 is a diagram showing the structure of an MAC subheader defined in an LTE system.

In particular, FIG. 8a illustrates the structure of a subheader of R/R/E/LCID type.

Referring to FIG. 8a, R is a reserved bit, and is set to 0. Further, E is an extension field, and includes a flag bit indicating whether there is an additional field in the MAC header. That is, in the case in which E is set to 1, it is indicated that there is another header of R/R/E/LCID type.

Lastly, the LCID is a logical channel identifier field, and indicates whether there is a corresponding local channel or MAC CE. For example, in the existing LTE system, in the case in which the LCID is set to 11010, it is indicated that there is an MAC CE including a PHR.

Therefore, the effect of indicating the existence of the MAC CE including the power headroom information in advance through the LCID is guaranteed.

Based thereon, as described in FIG. 8a, a PDU including the MAC header, MAC CE, MAC SDU and padding bit, etc. may be transmitted.

Further, in the LTE-A system, as the carrier aggregation technology is introduced, there came to be a need for a change in the power headroom report (PHR).

The PHR of the existing LTE system reported the power headroom for one cell, but if the carrier aggregation technology is introduced, a plurality of serving cells are used, and thus the power headroom for the plurality of serving cells needs to be reported.

Therefore, a new PHR format and operation method for the carrier aggregation technology should be designed.

The present invention provides a method for reporting, by an UE, the power headroom for a plurality of serving cells using a new PHR format.

Here, it may not be necessary to report the power headroom for all of the plurality of serving cells which have been set in the UE. For example, if a certain serving cell is set, the cell may be in an activated or deactivated state depending on the state, the serving cell in the deactivated state does not need to report the power headroom because the cell is not used until the cell is activated. Therefore, the UE may need to transmit only the power headroom information on at least one activated serving cell.

To this end, the power headroom information including a plurality of power headroom reports may indicate whether there is a power headroom level for each of the plurality of serving cells by having a field including a plurality of indicators. That is, the UE generates power headroom information, which includes at least one first field including a plurality of indicators and a plurality of second fields indicating respective power headroom levels of serving cells, and transmits the generated power headroom information to the base station.

Hereinafter, for the convenience of explanation, a field including a plurality of indicators is called a first field, and a field, which indicates the power headroom level for each serving cell, is called a second field.

As described above, since a second field indicates the power headroom level for at least one serving cell, the field may be singular or plural, and each of the plurality of indicators included in the first field indicates whether the second field exists for each of the at least one serving cell.

Preferably, each of the plurality of indicators may be set to 0 or 1. At this time, the indicator, which has been set to 1, may indicate that there is a second field for the corresponding serving cell, and the indicator, which has been set to 0, may indicate that there is not a second field for the corresponding serving cell.

Here, the first field is a field of a bitmap form, may be included in the power headroom information regardless of whether there is at least one second field, and may be transmitted.

Further, a subheader, which includes an LCID that is used to notify the existence of the power headroom information including a plurality of power headroom reports, may be transmitted along with the power headroom information. Hence, the effect of easily recognizing the existence of the power headroom information including a plurality of power headroom reports through a newly designated LCID is guaranteed.

Further, in the case in which the UE receives the setting of a plurality of serving cells from the base station (eNB), each of the serving cells is given a cell index for mutual identification, and the first field and the second field may be included in the power headroom information according to each cell index.

The number of serving cells, which may be actually operable in the carrier aggregation technology, is 5, and the cell index is allocated between 0 and 4.

For example, the second field may be included in the power headroom information from the smallest cell index of each corresponding cell to the largest cell index in order. In response thereto, each of the plurality of indicators included in the first field may be sequentially arranged in the first field from the right to the left according to the cell index of a corresponding cell.

At this time, transmitting, by the UE, the power headroom report on the plurality of serving cells too frequently may cause deterioration of performance by causing a waste in radio resources by the transmission itself. Hence, the UE may constitute the power headroom report on the plurality of serving cells only in the case in which a preset condition is satisfied. Hereinafter, the condition is called a PHR-CA trigger condition.

The PHR-CA trigger condition may include the conditions below. First, after the power headroom report is transmitted to the base station (eNB), a case in which the path loss exceeds a preset range may be set as a condition. Next, a case in which the parameter related with the power headroom information is set or reset, or a case in which a preset power headroom information timer expires, etc. may be set as a condition. However, the above listed conditions are merely examples, and various conditions may be set as a PHR-CA trigger condition without any limitation.

In the case in which any one of the plurality of serving cells satisfies the above condition, the configuration of the power headroom report of the UE is triggered, and in the case in which there is a newly received UL grant in the TTI, the transmission of the power headroom report on the plurality of serving cells is performed through the process described below.

That the UE receives the power headroom information level value transmitted from the physical layer, generates the PHR MAC control element (CE) based on the power headroom information level value, and transmits the generated PHR MAC control element. Thereafter, the UE may restart the preset power headroom information timer.

At this time, although a plurality of serving cells have been set in the UE, the power headroom information may be transmitted only through one serving cell.

Further, in the case in which the generation of the second field on one serving cell among a plurality of serving cells is triggered, the generation of the second field on the whole of at least one serving cell may be triggered.

More details of the present invention will be described with reference to drawings.

FIG. 9 is a diagram showing an MAC subheader and an MAC CE format for PHR-CA according to an exemplary embodiment of the present invention.

First, referring to FIG. 9, R included in the MAC subheader is a reserved field and is set to 0, and E is an extension field and notifies whether there is an additional MAC subheader in the next. The logical channel ID (LCID) field gives information on which content is included in the MAC CE, and a new value is used in the LCID to notify that the MAC CE is a newly defined PHR-CA MAC CE.

Next, the PHR-CA MAC CE indicates information on the serving cell, for which the PHR-CA MAC CE includes the PHR, including the first field composed of a plurality of indicators in the first byte.

In the carrier aggregation technology, since a maximum of five serving cells may be used, the first field of 5 bits may be used, and the cell index of each serving cell is one to one mapped to each of the indicators of the first field.

The second field for each serving cell is included only when the indicator of the first field is set to 1. That is, the UE configures the PHR-CA including the second field only for the serving cell which needs reporting.

In FIG. 9, indicators corresponding to the small cell index are arranged from the rightmost to the left. Further, the second field for each serving cell is included in the power headroom information in an ascending order from the small cell index.

Therefore, referring to the first field, only the indicators corresponding to serving cells 1 and 4 have been set to 1, and thus only the second field corresponding to serving cells 1 and 4 is included in the power headroom information.

Further, in the PHR-CA MAC CE format, 8 bits, not 5 bits, may be used for the first field according to the range of the cell index. That is, when a cell index of three bits is used, the range of the index is between 0 and 7, and in this case, the first field should also use 8 bits. However, even if the range of the cell index is 0 to 7, the number of serving cells, which are actually set, may be equal to or less than 5.

Here, the serving cell, whose cell index is 0, is a primary cell, and may include two types of PHRs. First, PHR type 1, which is a difference between the maximum power that may be transmitted through the primary cell, and the power that is transmitted in the current physical uplink shared channel (PUSCH), may be included. Further, PHR type 2, which is a difference between the maximum power that may be transmitted through the primary cell, and the power that is transmitted in the current physical uplink shared channel (PUSCH) and physical uplink control channel (PUCCH), may be included.

The first field of 8 bits, PHR type 1 and PHR type 2 will be specifically described with reference to drawings.

FIG. 10 is a diagram showing an MAC subheader and another MAC CE format for PER-CA according to an exemplary embodiment of the present invention.

The first field of 8 bits is used in FIG. 10. As in FIG. 9, indicators corresponding to the small cell index are arranged from the rightmost to the left, and the second field for each serving cell is included in the power headroom information in an ascending order from the small cell index. Further, the second field for each serving cell is included only when the indicator of the first field is set to 1.

Referring to the first field, only the indicators corresponding to serving cells 1, 4 and 6 have been set to 1, and thus only the second field corresponding to serving cells 1, 4 and 6 are included in the power headroom information.

At this time, serving cell 1 is a primary cell, and may have the second field of PHR type 1 and PHR type 2.

Hence, the final power headroom information includes PHR type 1 and PHR type 2 of serving cell 1, PHR of serving cell 4 and PHR of serving cell 6.

Figure 11:
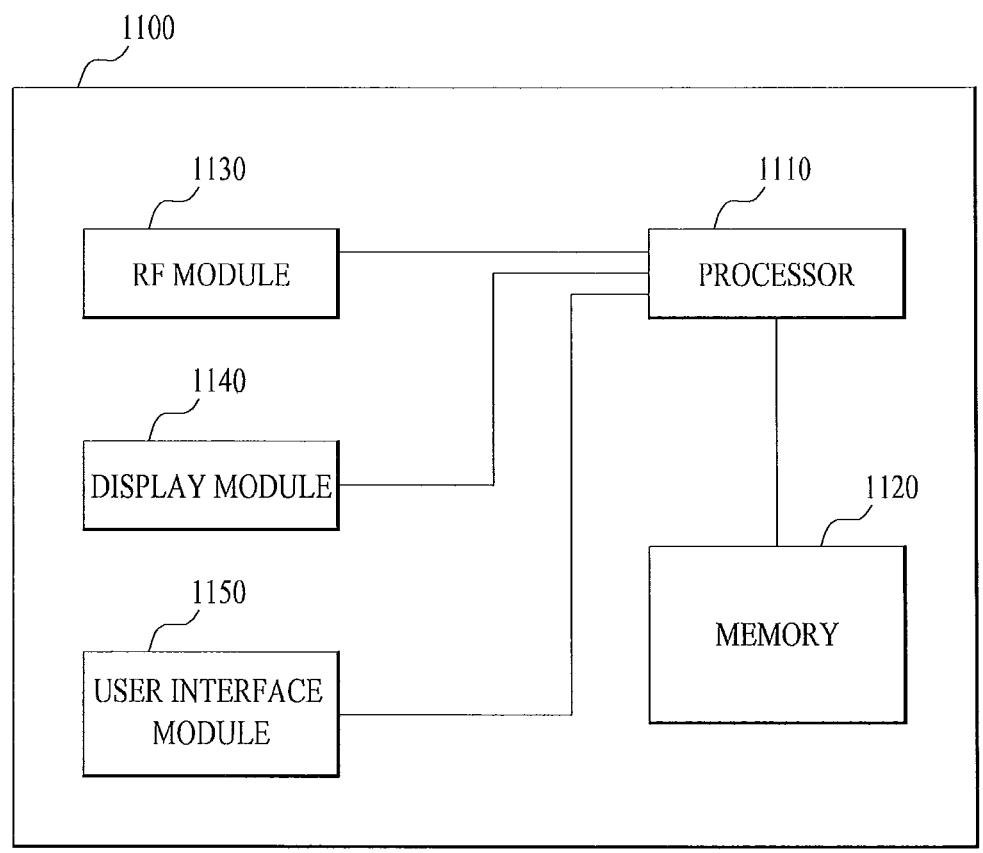
FIG. 11 is a block diagram of a communication device according to an exemplary embodiment of the present invention.

FIG. 11 is a block diagram of a communication device according to an exemplary embodiment of the present invention.

Referring to FIG. 11, the communication device 1100 includes a processor 1110, a memory 1120, an RF module 1130, a display module 1140, and a user interface module 1150.

The communication device 1100 has been illustrated for the convenience of explanation, and some modules may be omitted. Further, the communication device 1100 may further include necessary modules. Further, some modules may be divided into more specific modules in the communication device 1100. The processor 1110 may be configured to perform operation according to an exemplary embodiment of the present invention with reference to drawings. Specifically, the specific operation of the processor 1110 has been described above with reference to FIGS. 1 to 10.

The memory 1120 is connected with the processor 1110 and stores an operating system, an application, a program code, and data therein. The RF module 1130 is connected with the processor 1110 and converts a baseband signal to a radio signal or vice versa. To this end, the RF module 1130 performs analog conversion, amplification, filtering and frequency uplink conversion, or their reverse processes. The display module 1140 is connected with the processor 1110 and displays various kinds of information. Examples of the display module 1140 include, but not limited to, a liquid crystal display (LCD), a light emitting diode (LED), and an organic light emitting diode (OLED). The user interface module 1150 is connected with the processor 1110, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The method for allowing a terminal to transmit power headroom information in a wireless communication system, and an apparatus for the same has been described based on an example applicable to 3GPP LTE system, but may be applicable to various wireless communication systems other than the 3GPP LTE system.

The invention claimed is:

1. A method for transmitting, by a user equipment (UE) with which a primary cell and at least one secondary cell are configured, power headroom information in a wireless communication system, the method comprising:
generating the power headroom information; and
transmitting the power headroom information to a base station,
wherein the power headroom information includes a first field including a plurality of indicators, each of the plurality of indicators indicating the presence of a second field indicating a power headroom level of a corresponding secondary cell,
wherein the power headroom information further includes a third field indicating at least one power headroom level of the primary cell.

2. The method according to claim 1, wherein each of the plurality of indicators is set to "0" or "1", "1" representing that the second field exists for a corresponding secondary cell, and "0" representing that the second field does not exist for the corresponding secondary cell.

3. The method according to claim 1, wherein the corresponding secondary cell is an activated secondary cell.

4. The method according to claim 1, wherein the second field further indicates all power headroom levels of the at least one secondary cell.

5. The method according to claim 1, wherein the power headroom information is transmitted through the primary cell.

6. The method according to claim 1, wherein the first field is a field in a bitmap form.

7. The method according to claim 1, wherein the power headroom information is included in a medium access control (MAC) control element (CE), and is transmitted.

8. The method according to claim 7, wherein the MAC CE further includes a logical channel ID (LCID) for notifying existence of the power headroom information.

9. The method according to claim 1, wherein the second field is configured based on a cell index order of the at least one secondary cell.

10. The method according to claim 1, wherein the first field is followed by the third field, and the second field follows the third field if the second field is present.

11. The method according to claim 1, wherein the third field is always present in the power headroom information and includes a type-1 field and a type-2 field for the at least one power headroom level.

12. The method according to claim 11, wherein the type 1-field indicates a power headroom level of the primary cell calculated based on a transmission power of a physical uplink shared channel (PUSCH).

13. The method according to claim 12, wherein the power headroom level of the primary cell indicated by the type 1-field is determined based on a difference between a maximum transmission power for the primary cell and a current transmission power of the PUSCH.

14. The method according to claim 11, the type 2-field indicates a power headroom level of the primary cell calculated based on a transmission power of a physical uplink shared channel (PUSCH) and a physical uplink control channel (PUCCH).

15. The method according to claim 14, wherein the power headroom level of the primary cell indicated by the type 2-field is determined based on a difference between a maximum transmission power for the primary cell and a current transmission power of the PUSCH and the PUCCH.

16. A user equipment (UE), with which a primary cell and at least one secondary cell are configured, for transmitting power headroom information in a wireless communication system, the UE comprising:
a processor for generating the power headroom information; and
a transmission module for transmitting the power headroom information to a base station,
wherein the power headroom information includes a first field including a plurality of indicators, each of the plurality of indicators indicating the presence of a second field indicating a power headroom level of a corresponding secondary cell, wherein the power headroom information further includes a third field indicating at least one power headroom level of the primary cell.

17. The UE according to claim 16, wherein each of the plurality of indicators is set to "0" or "1", "1" representing that the second field exists for the corresponding secondary cell, and "0" representing that the second field does not exist for the corresponding secondary cell.

18. The UE according to claim 16, wherein the corresponding secondary cell is an activated secondary cell.

19. The UE according to claim 16, wherein, the second field further indicates all power headroom levels of the at least one secondary cell.

20. The UE according to claim 16, wherein the power headroom information is transmitted through the primary cell.

21. The UE according to claim 16, wherein the first field is a field in a bitmap form.

22. The UE according to claim 16, wherein the first field is followed by the third field, and the second field follows the third field if the second field is present.

23. The UE according to claim 16, wherein the third field is always present in the power headroom information and includes a type-1 field and a type-2 field for the at least one power headroom level.

24. The UE according to claim 23, the type 2-field indicates a power headroom level of the primary cell calculated based on a transmission power of a physical uplink shared channel (PUSCH) and a physical uplink control channel (PUCCH).

25. The UE according to claim 24, wherein the power headroom level of the primary cell indicated by the type 2-field is determined based on a difference between a maximum transmission power for the primary cell and a current transmission power of the PUSCH and the PUCCH.

26. The UE according to claim 23, wherein the type 1-field indicates a power headroom level of the primary cell calculated based on a transmission power of a physical uplink shared channel (PUSCH).

27. The UE according to claim 26, wherein the power headroom level of the primary cell indicated by the type 1-field is determined based on a difference between a maximum transmission power for the primary cell and a current transmission power of the PUSCH.

* * * * *